United States Patent
Salmela et al.

(10) Patent No.: US 11,252,572 B2
(45) Date of Patent: Feb. 15, 2022

(54) NETWORK APPLICATION FUNCTION REGISTRATION

(71) Applicant: Telefonaktiebolaget LM Ericsson (publ), Stockholm (SE)

(72) Inventors: Patrik Salmela, Espoo (FI); Joona Kannisto, Tampere (FI); Mohit Sethi, Helsinki (FI); Kristian Slavov, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/304,482

(22) PCT Filed: May 26, 2016

(86) PCT No.: PCT/EP2016/061888
§ 371 (c)(1),
(2) Date: Nov. 26, 2018

(87) PCT Pub. No.: WO2017/202466
PCT Pub. Date: Nov. 30, 2017

(65) Prior Publication Data
US 2019/0223009 A1    Jul. 18, 2019

(51) Int. Cl.
*H04W 12/50*    (2021.01)
*H04L 29/06*    (2006.01)
(Continued)

(52) U.S. Cl.
CPC ......... *H04W 12/50* (2021.01); *H04L 63/0823* (2013.01); *H04L 63/166* (2013.01);
(Continued)

(58) Field of Classification Search
CPC ......... H04W 12/003; H04W 12/04031; H04W 12/06; H04W 60/00; H04W 8/04;
(Continued)

(56) References Cited

U.S. PATENT DOCUMENTS

| | | | | |
|---|---|---|---|---|
| 2005/0283608 | A1* | 12/2005 | Halcrow | H04L 9/3218 713/175 |
| 2007/0074275 | A1* | 3/2007 | Bajko | H04L 9/3271 726/4 |

(Continued)

FOREIGN PATENT DOCUMENTS

| | | |
|---|---|---|
| GB | 2 518 254 A | 3/2015 |
| WO | 2013/159818 | 10/2013 |

OTHER PUBLICATIONS

International Search Report and Written Opinion issued in International Application No. PCT/EP2016/061888, dated Jan. 30, 2017, 12 pages.
(Continued)

*Primary Examiner* — Gregory B Sefcheck
*Assistant Examiner* — Joshua Smith
(74) *Attorney, Agent, or Firm* — Rothwell, Figg, Ernst & Manbeck, P.C.

(57) ABSTRACT

A method is provided for registration of a device as a Network Application Function, NAF, in a Generic Bootstrapping Architecture, GBA. The device performs a GBA bootstrap operation with a Bootstrapping Server Function, BSF, and sends to a NAF registration function a request to register as a NAF. The device receives NAF registration information from the NAF registration function, and performs a NAF registration with the BSF. The NAF registration function receives from the device a request to register as a NAF, confirms that that the device is authorised to act as a NAF, and transmits the NAF registration information to the device.

20 Claims, 9 Drawing Sheets

(51) Int. Cl.
  *H04W 12/069* (2021.01)
  *H04W 12/0431* (2021.01)
  *H04W 8/04* (2009.01)
  *H04W 60/00* (2009.01)
  *H04W 12/06* (2021.01)

(52) U.S. Cl.
  CPC ......... *H04W 8/04* (2013.01); *H04W 12/0431* (2021.01); *H04W 12/06* (2013.01); *H04W 12/069* (2021.01); *H04W 60/00* (2013.01)

(58) Field of Classification Search
  CPC ............. H04W 12/0609; H04W 12/50; H04W 12/069; H04W 12/0431; H04L 63/0823; H04L 63/166
  See application file for complete search history.

(56) References Cited

U.S. PATENT DOCUMENTS

| | | | |
|---|---|---|---|
| 2009/0138955 A1* | 5/2009 | Vinayakray-Jani | H04W 12/0431 726/12 |
| 2009/0209232 A1* | 8/2009 | Cha | H04L 63/0428 455/411 |
| 2010/0049980 A1* | 2/2010 | Barriga | H04L 12/66 370/352 |
| 2011/0064219 A1* | 3/2011 | Edlund | H04L 65/4076 380/211 |
| 2011/0126017 A1* | 5/2011 | Blom | H04L 63/06 713/171 |
| 2011/0142015 A1* | 6/2011 | Shaikh | H04L 29/12641 370/338 |
| 2011/0154457 A1* | 6/2011 | Hamada | H04L 29/12066 726/6 |
| 2013/0084829 A1* | 4/2013 | De Foy | H04W 12/06 455/411 |
| 2013/0227660 A1* | 8/2013 | Murakami | H04L 63/062 726/5 |
| 2013/0232546 A1* | 9/2013 | Shimono | H04L 63/0815 726/3 |
| 2015/0289222 A1* | 10/2015 | Lau | H04W 76/19 455/435.1 |
| 2015/0295905 A1* | 10/2015 | Leicher | H04W 12/06 726/4 |
| 2015/0326572 A1* | 11/2015 | Oyman | H04L 65/60 726/4 |
| 2016/0337329 A1* | 11/2016 | Sood | H04L 9/30 |
| 2016/0344744 A1* | 11/2016 | Tanoni | H04L 63/061 |

OTHER PUBLICATIONS

ETSI TS 133 220, V12.3.0 (Oct. 2014), Digital cellular telecommunications system (Phase 2+); Universal Mobile Telecommunications System (UMTS); LTE; Generic Authentication Architecture (GAA); Generic Bootstrapping Architecture (GBA) (3GPP TS 33.220 version 12.3.0 Release 12), Oct. 2014, 94 pages.
3GPP TS 33.220 V13.0.0 (Jan. 2016), 3rd Generation Partnership Project; Technical Specification Group Services and System Aspects; Generic Authentication Architecture (GAA); Generic Bootstrapping Architecture (GBA) (Release 13), Jan. 2016, 92 pages.

* cited by examiner

NETWORK APPLICATION FUNCTION REGISTRATION

CROSS REFERENCE TO RELATED APPLICATION(S)

This application is a 35 U.S.C. § 371 National Stage of International Patent Application No. PCT/EP2016/061888, filed May 26, 2016, designating the United States.

TECHNICAL FIELD

This relate to the Generic Bootstrapping Architecture, and to the registration of new Network Application Functions in the Generic Bootstrapping Architecture.

BACKGROUND

The Generic Bootstrapping Architecture (GBA) is a network service that provides authentication for nodes with access to 3GPP subscription credentials. When a device that has 3GPP credentials tries to access a GBA enabled service that is provided on a Network Application Function (NAF), the NAF will reply with a message, requesting the device to authenticate itself. A procedure then follows, in which the device is authenticated to use the service on the NAF.

In order to perform this procedure, the NAF that is providing the service must first manually establish a trust relationship with a network operator.

Existing mechanisms for establishing this trust relationship are acceptable for large service providers, and when the number of NAFs that a service provider wishes to deploy is relatively small, but the establishment of the necessary trust relationship may be difficult for small service providers and for a service provider that wishes to deploy a large number of NAFs.

SUMMARY

According to an aspect of the invention, there is provided a method of registration of a device as a Network Application Function, NAF, in a Generic Bootstrapping Architecture, GBA. The method comprises, in the device: performing a GBA bootstrap operation with a Bootstrapping Server Function, BSF; sending to a NAF registration function a request to register as a NAF; receiving NAF registration information from the NAF registration function; and performing a NAF registration with the BSF.

According to another aspect, there is provided a device for performing the method.

According to another aspect of the invention, there is provided a method of operation of a Network Application Function, NAF, registration function. The method comprises: receiving from a device a request to register as a NAF; confirming that that the device is authorised to act as a NAF; and transmitting NAF registration information to the device.

According to another aspect, there is provided a Network Application Function registration function device for performing the method.

This has the advantage that the deployment of a new NAF, and its mapping to an operator/BSF can become largely automatic. This means that, even for scenarios where an entity wants to deploy a large number of NAFs, the process can be automated, with reduced manual intervention by the operator.

DETAILED DESCRIPTION

Figure 1:
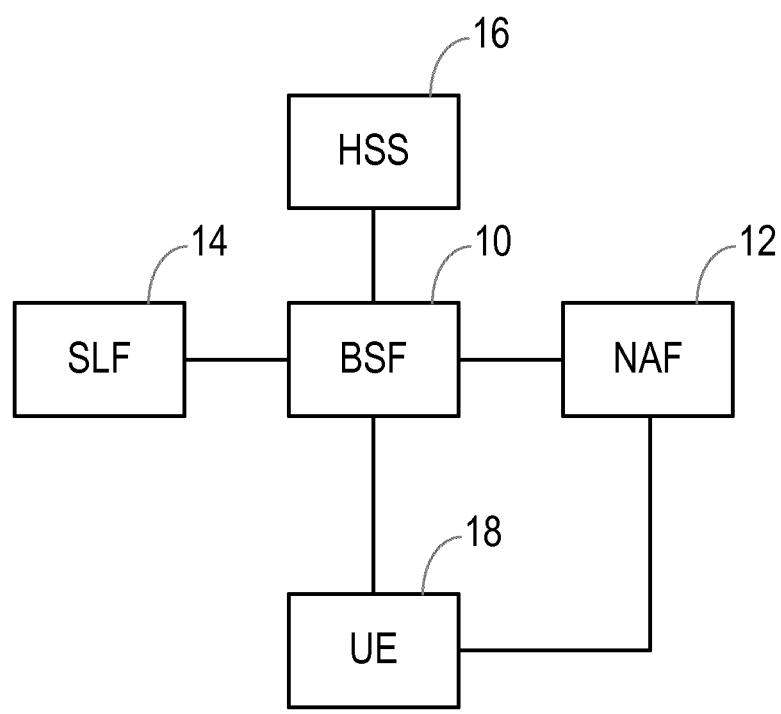
FIG. 1 illustrates schematically a part of a network operating using the Generic Bootstrapping Architecture.

FIG. 1 illustrates a part of a network using the Generic Bootstrapping Architecture (GBA). Specifically, FIG. 1 shows a Bootstrapping Server Function (BSF) 10 and a registered Network Application Function (NAF) 12. The Bootstrapping Server Function has connections to a Subscriber Locator Function (SLF) 14 and a Home Subscriber System (HSS) 16.

A User Equipment (UE) device 18 can use the Generic Bootstrapping Architecture to authenticate itself to the NAF, in order to securely use the services that it provides.

Figure 2:
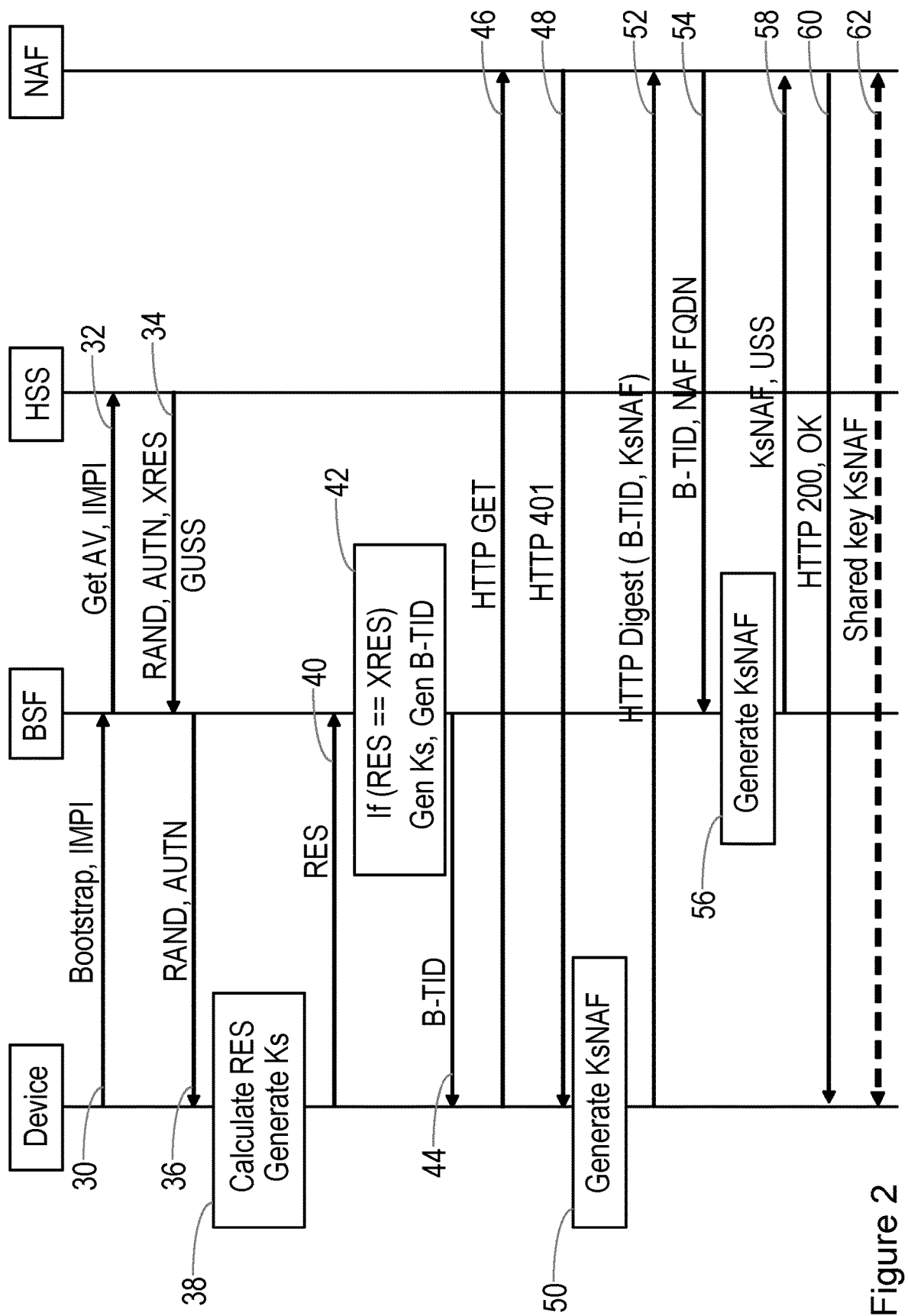
FIG. 2 is a signal flow diagram illustrating the use of the Generic Bootstrapping Architecture.

FIG. 2 illustrates the procedure whereby the UE device 18 authenticates itself to the NAF, in order to access a GBA enabled service on the registered NAF.

As illustrated in FIG. 2, the procedure may start at step 30, in which the device 18, having 3GPP credentials, starts a bootstrapping procedure with the BSF 10. The request sent at step 30 includes an identity, for example an IP multimedia private identity (IMPI) of the device.

If necessary, the BSF uses the Subscriber Locator Function (SLF) 14 to determine the Home Subscriber System (HSS) 16 that serves that device. At step 32, the BSF contacts the HSS, using the IMPI, to request an Authentication Vector (AV). At step 34, the HSS returns the Authentication Vector, which contains at least a random number RAND, an expected response XRES, a cipher key CK, an integrity key IK, and an authentication token AUTN, and the GBA user security settings (GUSS).

At step 36, the BSF sends RAND and AUTN to the device, and demands that the device authenticate itself to the BSF.

At step 38, the device UE checks AUTN to verify that the challenge is from an authorised network, and then also calculates the session keys CK and IK and the result value RES. A master key Ks can then be formed from CK and IK.

At step 40, the device sends a response, calculated using the result value RES, to the BSF. At step 42, the BSF authenticates the device by verifying that the received response RES is equal to the expected response XRES.

At step 42, the BSF generates a master key Ks by concatenating CK and IK. The BSF also generates an identifier B-TID for the bootstrapping run. At step 44, the BSF sends a message, including the B-TID, to the device to indicate the success of the authentication.

At step 46, the device contacts the registered NAF 12, and the NAF 12 responds at step 48 with an indication that bootstrapping is required.

At step 50, the device uses the Ks to derive a NAF specific key KsNAF, which is to be used for securing the reference point between the device and the NAF.

At step 52, the device replies to the message received from the NAF, using the NAF specific key KsNAF as the password and the bootstrapping identifier B-TID as the username.

The NAF has an existing trust relationship with the BSF/network operator, and therefore, at step 54, queries the BSF (using the B-TID) for the NAF specific key KsNAF, which the BSF generates at step 56 and provides to the NAF at step 58. The BSF also provides User Security Settings (USS) for the specific NAF, which can contain service specific policies and information related to the authenticated client.

The NAF can now authenticate the device, and sends a message at step 60 confirming the authentication.

As mentioned above, the interface between the NAF and the BSF, called the Zn interface, should be protected, e.g. with TLS, and there should be a trust relationship between the two. Based on this: the BSF shall verify that the requesting NAF is authorized to obtain the key material or the key material and the requested USS; the NAF shall be able to send a key material request to the BSF, containing NAF's public hostname used by the UE's corresponding request; the BSF shall be able to verify that a NAF is authorized to use this hostname, i.e. the FQDN used by the UE when it contacts the NAF; and the BSF shall be able to send the requested key material to the NAF.

Thus, in order to deploy a NAF, it is necessary to establish this trust relationship with the network operator.

Then, when a client performs GBA based authentication to the NAF, the NAF will learn the identity of the client and that the client has successfully bootstrapped with a BSF (i.e. is authenticated by an operator). Likewise, the client will, based on the fact the NAF knows the shared session key KsNAF, know that the NAF is authorized by an operator to act as a NAF for the specified FQDN, and there is mutual authentication.

Figure 3:
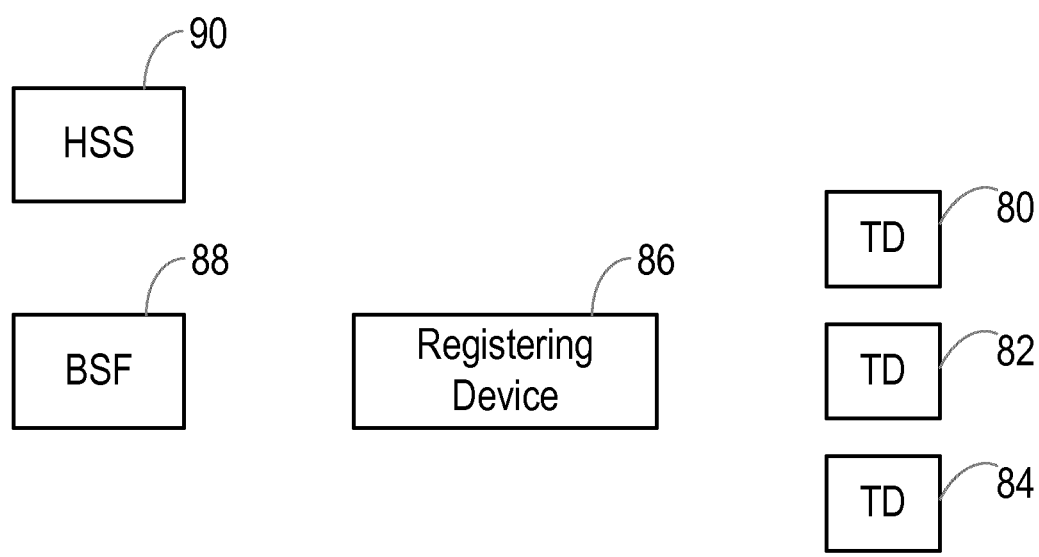
FIG. 3 is a schematic diagram illustrating a use of the present invention.

FIG. 3 illustrates a situation in which it is desirable to be able to deploy new Network Application Functions (NAFs). Specifically, FIG. 3 shows a situation in which there are multiple terminal devices (TDs) 80, 82, 84, which are intended to function in co-operation with a device 86, and may be located in the vicinity of the device 86, although in other situations the terminal devices may be located anywhere. In this embodiment, the term "terminal device" is used to refer to any device that is able to establish a connection with the device 86. For example, the term "terminal device" may refer to any personal communications device, such as a smartphone, tablet computer or the like, but may equally refer to a device that operates without user intervention, such as a sensor or the like, and may equally refer to devices that are intended to be remain in one location, or may be mobile, such as tracking devices and portable devices.

As an example, a car manufacturer might provide a device such as the device 86 in each car they manufacture, to which the passengers can authenticate their terminal devices 80, 82, 84 using the Generic Bootstrapping Architecture (GBA) when travelling in it, for example for entertainment. Also, the car owner might be enabled to perform functions in the car remotely, for example to turn on the car heater without going into the car. In addition, the car manufacturer could be allowed to authenticate to the NAF for gathering relevant data and performing diagnostics.

Another example is a capillary network, in which a device such as the device 86 takes the form of a capillary gateway, to which terminal devices such as the devices 80, 82, 84 can authenticate themselves. As one example of this, the capillary gateway could be a subscriber's smartphone and the terminal devices could be sensors that the subscriber is carrying or wearing on their person.

In other examples, the device 86 that might provide services based on GBA authentication could be a personal mobile phone, a tablet computer, a personal computer, a web server, or any other device with comparable processing and connectivity. The methods described herein are particularly useful in scenarios where the device owner does not have the resources to become a conventional NAF because of the cost and complexity that arise from the requirement of having a certificate and the need to perform the conventional NAF enrolment procedure for each separate NAF.

In the examples above, the device 86 might wish to register as a Network Application Function (NAF), so that the terminal devices 80, 82, 84 can authenticate thereto. As mentioned above, a NAF needs to register with a Bootstrapping Server Function, in order to have a trust relationship with it. In that case, the terminal devices can each act as the UE shown in FIG. 1.

In such cases, it would be likely that there would be a large number of such devices wishing to register at the Bootstrapping Server Function (BSF) as NAFs.

Thus, the device needs to establish a trust relationship with the network operator. As described in more detail below, the device uses the GBA bootstrapping procedure to establish a relationship with a BSF 88, which is able to contact the Home Subscriber Service 90 of the network operator.

Figure 4:
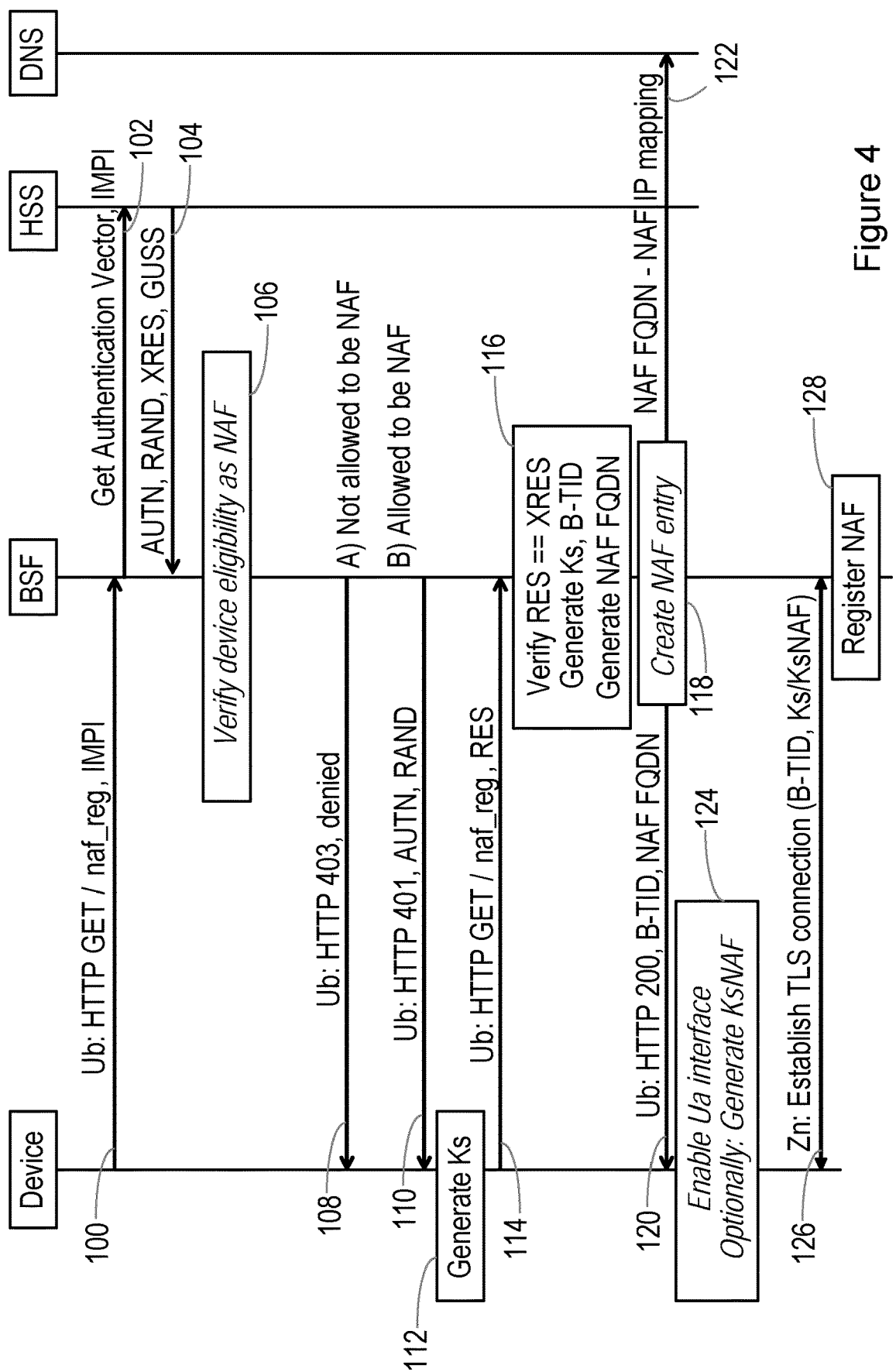
FIG. 4 is a signal flow diagram illustrating a first method according to the present invention.

FIG. 4 illustrates the registration process.

Specifically, FIG. 4 shows signalling messages exchanged between a registering device and a NAF registration function. In this example, the registering device, such as the registering device 86 shown in FIG. 3, is typically a mobile device such as a User Equipment device (UE), but it could be any suitable processing device that has 3GPP credentials, i.e. a subscription with a 3GPP operator. One possibility is for the owner of the registering device to obtain a suitable 3GPP subscription from a network operator. For example, the option of being allowed to register as a NAF might be provided by a network operator for an added fee, for example at the time of purchase of the device or later.

The process described herein uses a Fully Qualified Domain Name (FQDN) for the NAF, and so this subscription might allow the owner of the device to request a specific FQDN for his service, subject to the operator's approval.

Information relating to the subscription is then stored in the HSS together with all other subscription relevant information. For GBA, the suitable location to store the authorization information about acting as a NAF and any related information would be in the GUSS. When the device owner now inserts the SIM card into his device it is ready to register itself as a NAF and start providing the service.

The owner can have the device act as a NAF in an always on fashion, or he can choose to dynamically disable/enable it as needed. To enable the NAF functionality, the user has the device register itself to the operator/BSF as a NAF, as described below, after which the NAF is active and ready. De-registration could either be actively signalled or a bootstrapping timeout to BSF could take care of de-registration by simultaneously terminating the security on the Zn interface.

Also in the example shown in FIG. 4, the NAF registration function is implemented in the Bootstrapping Server Function (BSF) with which the newly registered NAF will be associated. However, the NAF registration function may be implemented in other network nodes, as described in detail below.

In some embodiments, the registration begins with the registering device starting a bootstrapping process with the BSF, by sending a HTTP GET request on the Ub interface for a resource such as /bootstrap or /bsf to indicate that it wants to bootstrap.

In some cases, in which the NAF registration function is implemented in the BSF, the boostrapping and registration may be combined. Instead of explicitly asking for/bootstrap or /bsf, the device asks for /naf_reg. This is shown in FIG. 4 at step 100. As part of registering the device as a NAF, the GBA bootstrapping procedure is also executed.

The process then continues as for a typical GBA bootstrapping. Thus, at step 102, the BSF contacts the HSS, using the IMPI, to request an Authentication Vector (AV). At step 104, the HSS returns the Authentication Vector, which contains at least a random number RAND, an expected response XRES, a cipher key CK, an integrity key IK, and an authentication token AUTN, and the GBA user security settings (GUSS). The GUSS contains generic subscription related information and policies and information for various services that the device might use. In this example, the GUSS also contains information about whether the subscription of the registering device allows it to act as a NAF.

At step 106, the BSF verifies from the GUSS if the subscription allows the registering device to act as a NAF. As an alternative to this, the BSF can obtain information direct from the Home Subscriber Server, confirming whether the device is authorized to act as a NAF.

If the device is not authorized to act as a NAF, the BSF replies as shown at step 108 with a HTTP 403 message to the device.

However, if the device is allowed to act as a NAF, the BSF replies at step 110 as in a typical GBA bootstrapping with AUTN and RAND.

At step 112, the registering device generates the bootstrapping master key Ks. At step 114, the device sends a response to the BSF, calculated using the result value RES.

At step 116, the BSF authenticates the device by verifying that the received response RES is equal to the expected response XRES. The BSF also generates the same key Ks that has already been generated by the device in step 112. In addition the BSF generates a B-TID for identifying this bootstrapping run.

In addition, the BSF generates and/or allocates a FQDN for the registering device from an operator DNS zone reserved for this (DNS suffix_gba.operator.com, for instance). Separate zone conveys the meaning of the names, and enables the delegation of the control of the zone.

Example FQDN formats:
<random>._gba.operator.com
the IMPU of the subscription with the '@' replaced by a dot or _gba. (e.g. an IPMU user@operator.com is used to generate a FQDN user._gba.operator.com)
<subscription phone number>._gba.operator.com.
Device provided name within operator domain (provided in the NAF request, e.g., GET/naf_reg? myid=mynaf→mynaf._gba.operator.com, with operator authorization)
Device provided name outside operator domain (provided in the NAF request, e.g. GET/naf_reg? myfqdn=mynaf.somservice.com). The owner can request a FQDN even outside the operator domain (e.g. someservice.com). In this case, the operator can provide the service of registering the domain (if available) on behalf of the owner of the device registering as a NAF, and allocating it to the subscription. Updating of the relevant DNS record can also be done by the operator, if so requested by the client.
Configured in the GUSS, e.g. the FQDN for the device registering as a NAF could be of the form: something._gba.operator.com. This could be registered to the GUSS/operator by the owner of the device registering as a NAF, and the operator would verify it as valid before adding it to the GUSS). If the owner requests an FQDN that can be allocated to that device, the BSF can additionally provide that FQDN for an additional one-off, monthly, or annual charge.

The BSF might also involve other entities in the 3GPP core for selecting a suitable FQDN.

In addition, the operator might provide separate subdomains for well-known entities with many NAFs and more generic FQDNS for private entities:
<random>.<CAR MANUFACTURER>._gba.operator.com for a car manufacturer's cars
<random>.<MOBILE MANUFACTURER>._gba.operator.com for mobiles of a specific manufacturer
<random>._gba.operator.com to private entities
<random>.<PHONE NUMBER>_gba.operator.com, with different initial strings being used for multiple services tied to a single subscription.

This way a client connecting to a NAF that has been registered using this procedure will also have some insight into what type of entity is operating the service.

At this point, the device has been authenticated at the BSF and GUSS has indicated that the device is allowed to act as a NAF. At step 118, the BSF creates a NAF entry for the device, adding the information of the registering device (such as the NAF FQDN and the B-TID) to the list of NAFs that the BSF is allowed to serve.

At step 120, the BSF then sends the final HTTP 200 OK message to the device on the Ub interface, indicating that the bootstrapping/NAF registration has been successful. In the HTTP 200 message, the BSF includes the FQDN allocated for the NAF. This is the FQDN that the BSF has selected for the NAF. If the NAF requested a FQDN that the BSF does not agree to, the BSF can optionally generate a new FQDN for the NAF and includes that in the 200 OK message. Then, if the device still wants to act as a NAF it must accept the proposed FQDN even if it does not match the requested one. The device may retry NAF registration with another FQDN as well. In a case in which the BSF does not allow the requested FQDN to be used, it may still want to indicate that authentication of the UE was a success by returning the HTTP 200 OK message. In the payload of that message, the BSF may then signal that the requested FQDN cannot be used by setting the FQDN field to an empty string, or omitting the FQDN field altogether.

At the same time, at step 122, the BSF also registers the FQDN of the newly registered NAF with the DNS server of the operator, adding the mapping between the newly allocated FQDN and the current IP address of the device/NAF. The BSF might know the IP of the device based on the ongoing communication, or it might request the information from some other entity in the 3GPP core, e.g. the Mobility Management Entity (MME) or Packet Data Network Gateway (PDN-GW).

With the entry for the registering device (e.g. device._gba.operator.com) in the operator DNS, a query from a client that wishes to connect to that device after it has been registered as a NAF will first go to the default DNS resolver of the client, which will query the authoritative DNS server of the operator, which can give the final result to the query and provide the IP address of the registering device now acting as a NAF. It should be noted that DNS is not part of the trusted infrastructure, and only the B-TID, which is not confidential, can leak due to a DNS compromise (i.e. if an attacker gets the client redirected to the attacker's server/NAF, the attacker can only learn the B-TID of the client, which is at least semi-public in any event).

At step 124, the registering device enables the Ua interface so that terminal devices or User Equipment devices can connect thereto. The registering device may also generate a key KsNAF using the newly allocated FQDN.

The registering device then establishes the trust relationship that the 3GPP standard requires. Specifically, in step 126, the registering device, now over the Zn interface, establishes a Transport Layer Security (TLS) connection with the BSF. The registering device uses the B-TID as key identifier and uses either the bootstrapping master key Ks or the key KsNAF generated in step 124 as the pre-shared key (PSK), and then establishes a PSK TLS connection with the BSF.

Once the TLS connection is established, at step 128, the BSF can mark the registering device as registered as a NAF, as it now fulfils the requirements of the NAF and the Zn interface.

The lifetime of the FQDN allocated to the registering device could be configured to be short-lived to give only temporary NAF status to a registering device if so desired. The NAF status could for example be bound to the bootstrapping context lifetime, and once that has run out, the registering device can no longer request KsNAFs from the BSF unless it rekeys/re-bootstraps, which might also result in a new FQDN being allocated to the registering device. Alternatively, the registering device could be allowed to continue as a NAF for as long as it wants either by using the pre master key as a long lived shared secret between the registering device and BSF or by allowing the registering device to re-bootstrap if the bootstrapping lifetime has run out and let the registering device keep the FQDN allocated to it.

Figure 5:
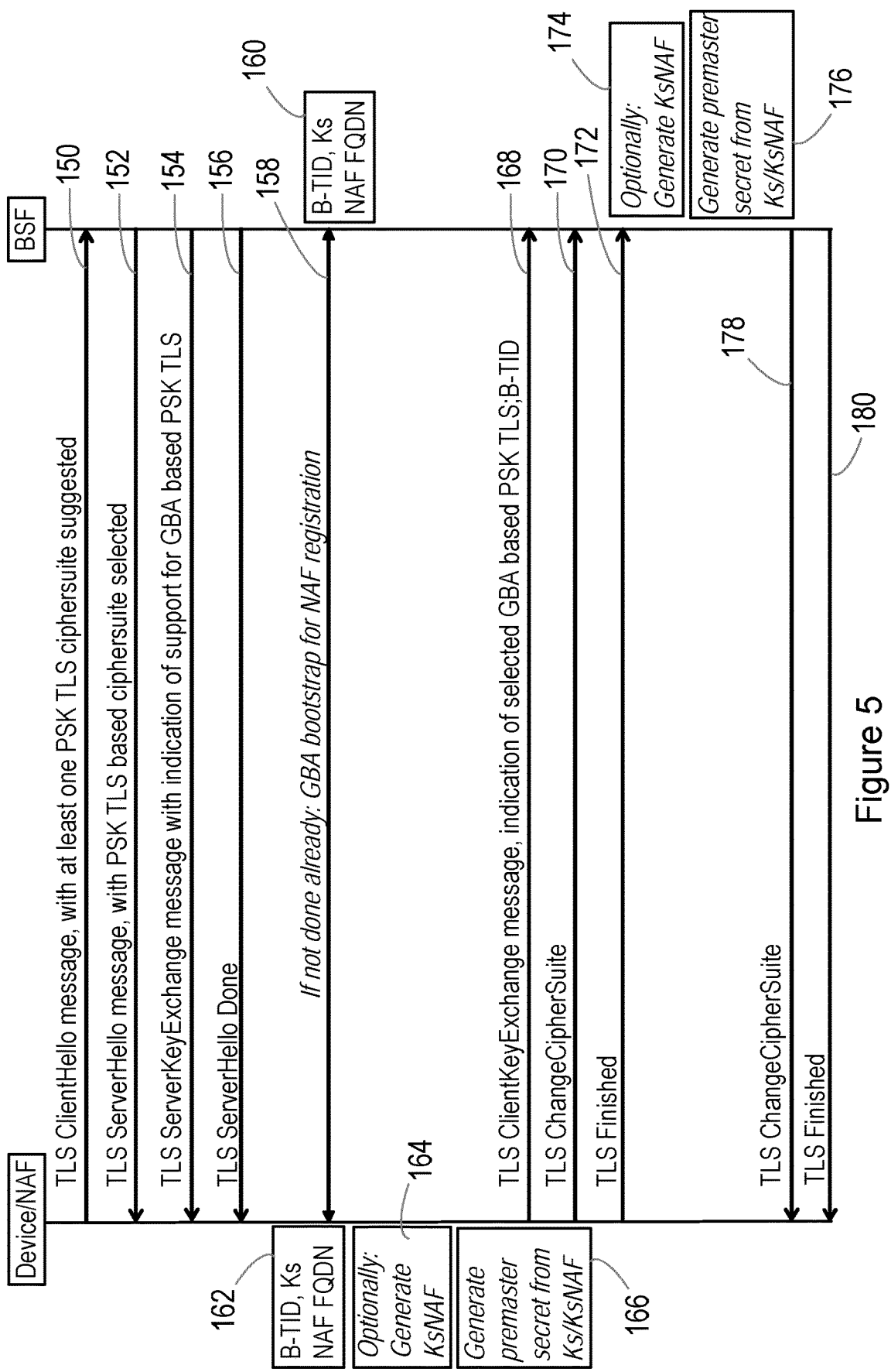
FIG. 5 is a signal flow diagram illustrating a part of the first method according to the present invention.

FIG. 5 shows in more detail the process by which the PSK TLS connection can be established between the device that is registering as a NAF and the BSF as shown at step 126 of FIG. 4. This is based on the 3GPP standard TS 33.222, section 5.4.

FIG. 4 shows that the PSK TLS connection is established after the BSF has created the NAF entry for the registering device. However, an alternative as shown in FIG. 5 is that the registering device can start by initiating the TLS connection with the BSF and only then run the bootstrapping/NAF registration as discussed above.

At step 150 as shown in FIG. 5, the device registering as a NAF sends a ClientHello message to the BSF, adding one or more suggested PSK-based ciphersuites to the message.

At step 152, the BSF selects one of the PSK-based ciphersuites offered by the registering device, and sends the selected ciphersuite to the UE in the ServerHello message.

At step 154, the BSF sends the ServerKeyExchange message to the registering device with at least one PSK-identity hint, indicating the GBA as the required authentication method. At step 156, the BSF finishes the reply to the UE by sending a ServerHelloDone message.

If not already done, the registering device and the BSF now perform the GBA bootstrap that is required for NAF registration, at step 158. In either case, once the bootstrapping/NAF registration has completed, the BSF and the registering device have the key Ks, the associated B-TID and the newly allocated FQDN, as shown at 160, 162 respectively.

At step 164, the registering device can now optionally also generate the key KsNAF using the newly allocated FQDN. Then, as shown at 166, the registering device generates the Premaster key either from the key Ks or the key KsNAF before sending the ClientKeyExchange message with the B-TID as key identifier at step 168.

The TLS handshake concludes with the TLS ChangeCipherSuite message at step 170 and the TLS Finished message at step 172.

Once the BSF receives the TLS Finished message from the registering device it can at step 174 also optionally generate the same key KsNAF based on the FQDN stored in the NAF entry, which can be located using the B-TID. After this, at step 176, the BSF also generates the same premaster key as the registering device did earlier. The TLS connection can now be established using the premaster key, and the BSF can send a TLS ChangeCipherSuite message at step 178 and a TLS Finished message at step 180.

This allows the NAF—BSF interface, i.e. the Zn interface, to be authenticated using PSK TLS, based on the GBA bootstrapping security (that is, using Ks or KsNAF as the Pre-Shared Key).

As an alternative, using certificates for authentication of the Zn interface allows for a separation of the BSF NAF provisioning and client usage roles, which could be important for scalability, for example.

Figure 6:
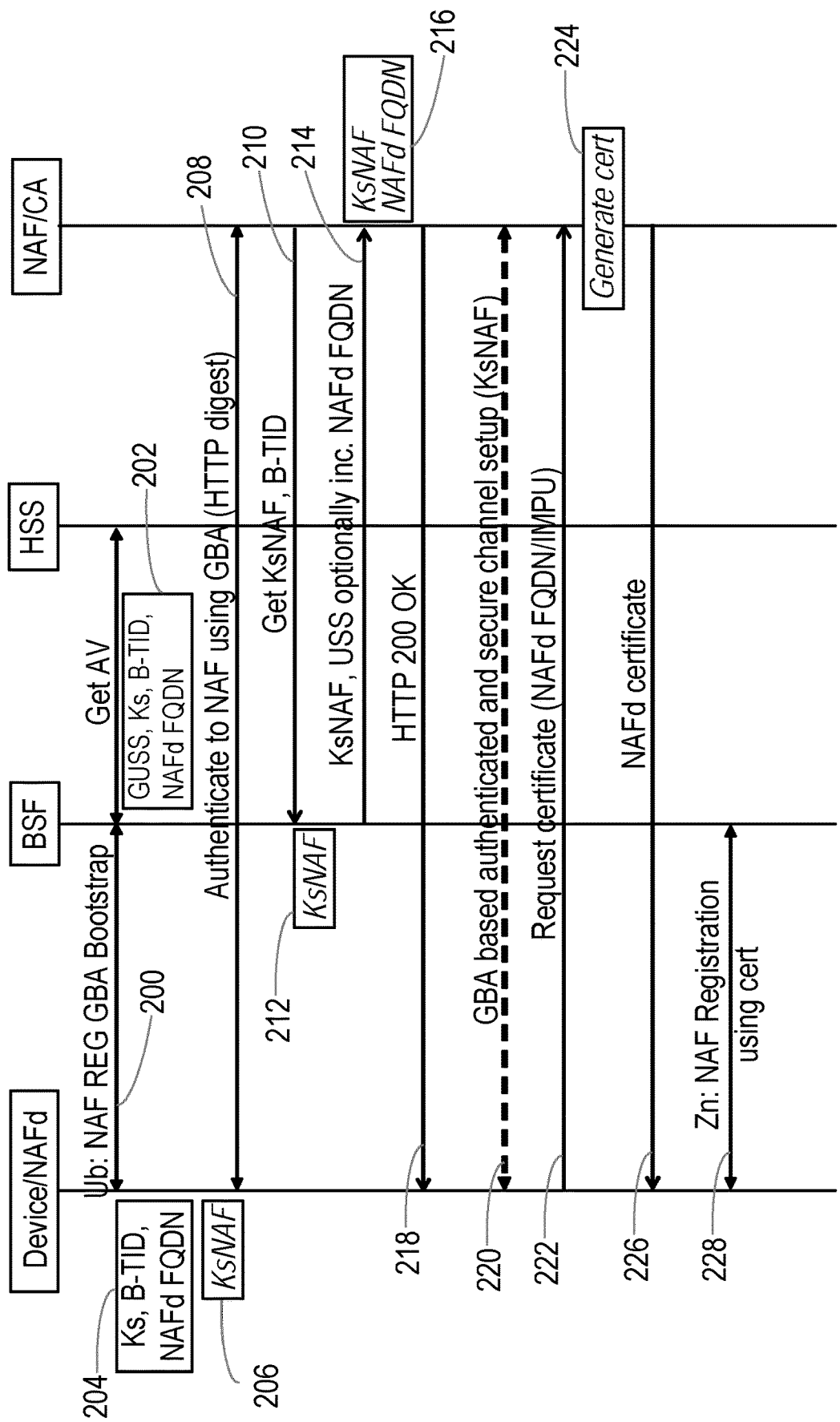
FIG. 6 is a signal flow diagram illustrating a second method according to the present invention.

FIG. 6 therefore shows an alternative procedure which uses certificates for the trust relationship on the Zn interface.

As shown at step 200, the registering device registers/bootstraps with the BSF as described with reference to FIG. 4, as part of which the BSF requests the authentication vector from the HSS. As previously described, and as shown at 202, the BSF now has the GUSS, Ks, B-TID and FQDN for the registering device, while the device itself has the Ks, B-TID and FQDN as shown at 204. As shown at 206, the registering device is also able to generate the keying material Ks.

Next, at 208, the device registering as a NAF connects to a NAF that is provided by the operator, and which is used as a certificate authority (CA) for providing certificates to 3GPP subscriptions. This NAF is referred to in FIG. 5 and in the description below as the NAF/CA. The device registering as a NAF authenticates to the NAF/CA using GBA credentials obtained during the bootstrap/NAF registration.

At step 210, the NAF/CA requests the key KsNAF from the BSF. At step 212, the BSF generates KsNAF, if it has not previously done so. At step 214, the BSF notifies the NAF/CA of KsNAF and the USS, which can include the FQDN allocated to the registering device. Thus, as shown at 216, in this case the NAF/CA now knows the KsNAF and the FQDN.

Alternatively, if the FQDN is not added to the USS, the USS could contain e.g. the IMPU of the registering device.

At step 218, the NAF/CA authenticates the registering device and responds with a 200 OK after which, at 220, the device and the NAF/CA can establish a secure communication channel based on the key KsNAF between the two.

Now, at step 222, the registering device can request a certificate from the NAF/CA, based either on the FQDN or the IMPU.

At step 224, depending on what information was included in the USS, the NAF/CA creates a certificate for the device/NAF and includes either the FQDN, the IMPU or both. The NAF/CA sends this certificate to the registering device at step 226.

Finally, at step 228, the device registering as a NAF can now register with the BSF over the Zn interface using a certificate which can be mapped to the subscription based on the FQDN or IMPU included in the certificate. If the FQDN is included, the BSF will find the NAF entry created earlier and mark the NAF as registered. If the certificate only has the IMPU, the registering device may indicate to the BSF during the registration process the FQDN that has been allocated to it, or may indicate the B-TID. This allows the BSF to obtain the required information by matching the subscription associated with the IMPU and/or the subscription associated with the bootstrapping context/B-TID. Alternatively, the BSF could store the IMPU with the bootstrapping context for all bootstrapping procedures that are done with the resource /naf_reg. This would allow the BSF to register the NAF by searching all pending NAF registrations to find the one that corresponds to that IMPU. In addition, the subscription (e.g. IMPU) or bootstrapping (e.g. B-TID) can be signalled to the BSF using user mapping extensions in TLS, regardless of the information in the certificate itself.

Once this registration has been performed once, the trust relationship is established and the BSF installs the certificate as a trusted NAF certificate, and so future authentications will use the standard authentication process used with a NAF.

As described so far, it is assumed that the NAF registration function, which takes care of registering the device as a NAF, is implemented in the BSF to which the NAF will be associated.

Figure 7:
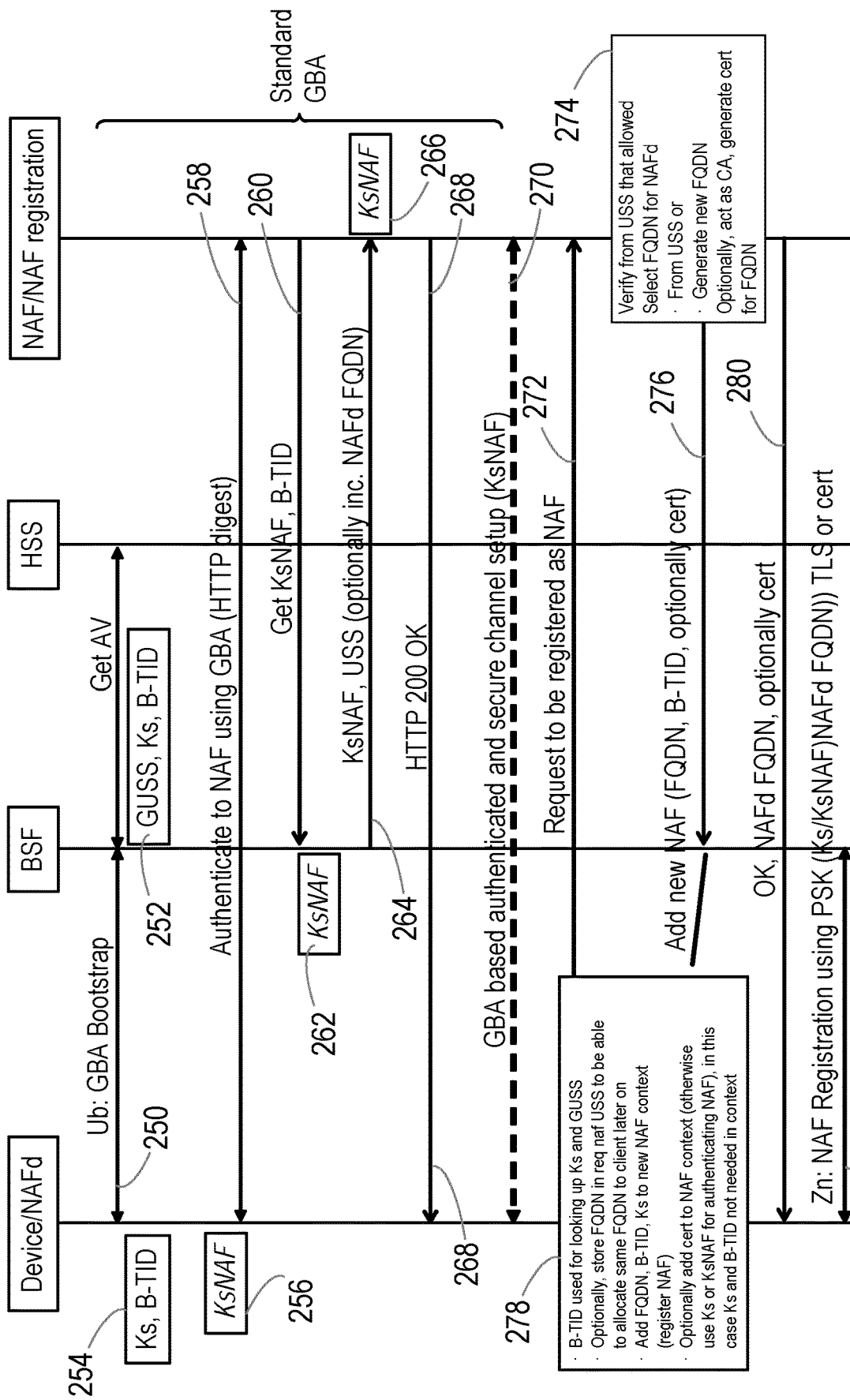
FIG. 7 is a signal flow diagram illustrating a third method according to the present invention.

However, an alternative to using the /naf_reg resource on the BSF for registering the device at the BSF is to allocate a separate NAF for this purpose in the 3GPP core, possibly together with the BSF. In this case, as described with reference to FIG. 7, the registering device performs a regular bootstrapping with BSF (using the resource/bootstrap, not /naf_reg) and then connects to the specific NAF that is meant for registering other NAFs to the BSF. This has some similarities to the use of a NAF that acts as a Certification Authority, as described with reference to FIG. 6.

As shown at step 250, the registering device bootstraps with the BSF as described with reference to FIG. 4, as part of which the BSF requests the authentication vector from the HSS. As previously described, and as shown at 252, the BSF now has the GUSS, Ks, and B-TID for the registering device, while the device itself has the Ks and B-TID as shown at 254. As shown at 256, the registering device is also able to generate the keying material KsNAF.

Next, at 258, the device registering as a NAF connects to the NAF that is provided by the operator, and which provides or hosts a NAF registration function for registering new NAFs. The device registering as a NAF authenticates to the NAF registration function using GBA credentials obtained during the bootstrap.

At step 260, the NAF registration function requests the key KsNAF from the BSF. At step 262, the BSF generates KsNAF, if it has not previously done so. At step 264, the BSF notifies the NAF that is providing or hosting the NAF registration function of KsNAF and USS, which might include the FQDN, and so, as shown at 266, the NAF registration function now knows KsNAF.

At step 268, the NAF that is providing or hosting the NAF registration function authenticates the registering device and responds with a 200 OK after which, at 270, the device and the NAF that is providing or hosting the NAF registration function can establish a secure communication channel based on the key KsNAF between the two.

Now, at step 272, after authenticating to the NAF registration function using this standard GBA procedure, the registering device requests to be registered as a NAF. The registering device can provide a suggested FQDN as in the procedure of FIG. 4, or can request the NAF to generate a FQDN.

At step 274, the NAF registration function uses the USS received from the BSF to validate that the registering device is allowed to act as a NAF. As an alternative to this, the BSF can obtain information direct from the Home Subscriber Server, confirming whether the device is authorized to act as a NAF. Also, the NAF registration function generates, finds from USS, or allocates a FQDN for the registering device. If the registering device provided a suggested FQDN in the step 272, the NAF registration function can approve or disapprove this FQDN.

The process of generating an FQDN can be as described with reference to step 116 in the process of FIG. 4. Thus, as examples, the USS can contain e.g. the IMPU and/or phone number of the registering device, which can be used as input for generating the FQDN.

In addition, the NAF that is providing or hosting the NAF registration function may have additional functionality, allowing it to serve as a Certification Authority as described with reference to FIG. 6, and may additionally generate a certificate for that FQDN.

As shown at step 276, once the NAF that is providing or hosting the NAF registration function has generated the FQDN and informed it to the operator's DNS, it informs the BSF that a new NAF can be registered. The NAF registration function also informs the BSF of the B-TID of the registering device so that the BSF can add an entry for that device. The NAF registration function also informs the BSF of the certificate, if generated.

As shown at 278, the B-TID is used for looking up Ks and GUSS. The received FQDN may be stored by the BSF in the USS of the NAF that is providing or hosting the NAF registration function, in order to be able to allocate the same FQDN to the client later on. The BSF adds the FQDN, B-TID, KsNAF and Ks to a new NAF context, and thus registers the NAF. Ks or KsNAF may be used for authenticating the NAF. The BSF may add the received certificate to the NAF context, so that this can be used for authenticating the NAF, in which case it is not necessary to store Ks, KsNAF and B-TID in the context.

As shown at 280, the NAF that is providing or hosting the NAF registration function also informs the registering device of the FQDN, confirming that it has been authorised, and also includes the certificate, if generated.

At step 282, the device registering as a NAF and the BSF can establish a PSK TLS session with the BSF over the Zn interface, as described with reference to FIGS. 4 and 5, and the BSF can then mark the device as a registered NAF.

Figure 8:
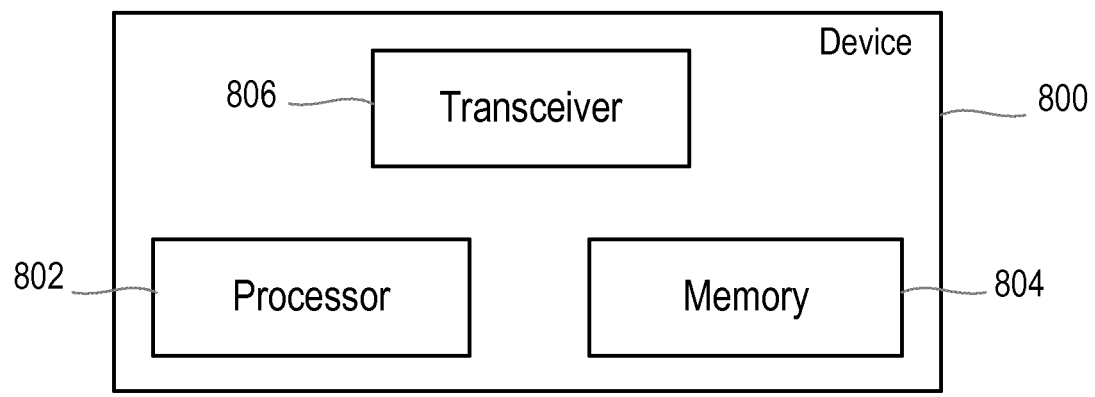
FIG. 8 illustrates a device in accordance with an aspect of the invention.

FIG. 8 illustrates a device 800 that can be adapted or configured to operate according to one or more of the non-limiting example embodiments described. The device 800 comprises a processor or processing unit 802 that controls the operation of the device 800. The device 800 also comprises a memory or memory unit 804 that is connected to the processing unit 802 and that contains instructions or computer code executable by the processing unit 802 and other information or data required for the operation of the device 800 in accordance with the methods described herein. As shown, the device may be in the form of a wireless terminal device, or UE, and may therefore also include a transceiver circuit 806 (also referred to as a transceiver) including a transmitter and a receiver configured to provide radio communications with at least one node of a radio access network.

Figure 9:
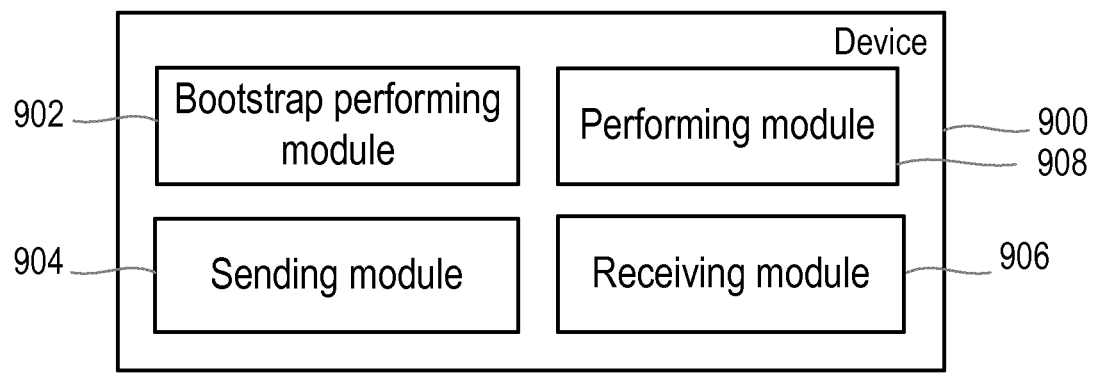
FIG. 9 illustrates a device in accordance with an aspect of the invention.

FIG. 9 illustrates functional units in embodiments of a device (for example in the form of a UE) which may execute any of the methods described herein, for example according to computer readable instructions received from a computer program. It will be understood that the modules illustrated in FIGS. 9 and 10 may be software implemented functional units, realised in any appropriate combination of software modules, or may be hardware implemented functional units, realised in any appropriate combination of hardware units, or any combination thereof.

FIG. 9 illustrates a terminal device (UE) 900 according to embodiments. The terminal device 900 comprises a bootstrap performing module 902 for performing a GBA bootstrap operation with a Bootstrapping Server Function, BSF. The device 900 comprises a sending module 904 for sending to a NAF registration function a request to register as a NAF. The UE further comprises a receiving module 906 for receiving NAF registration information from the NAF registration function. The UE further comprises a performing module 908 for performing a NAF registration with the BSF, so that the device is registered as a Network Application Function, NAF, in a Generic Bootstrapping Architecture, GBA.

Figure 10:
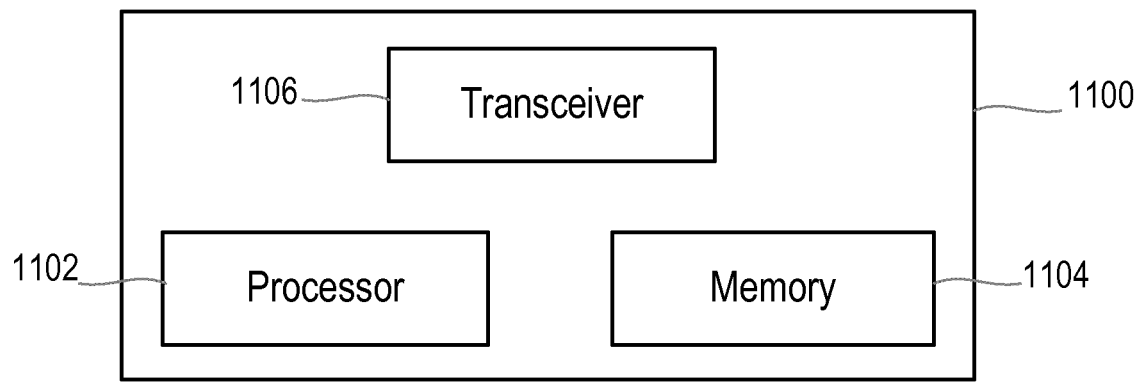
FIG. 10 illustrates a Network Application Function registration function in accordance with an aspect of the invention.

FIG. 10 illustrates a Network Application Function, NAF, registration function 1100, which may be implemented in any suitable node of a communications network that can be adapted or configured to operate according to one or more of the non-limiting example embodiments described, and may for example be implemented in a Bootstrapping Server Function, BSF, or in a separate NAF of the communications network. The NAF registration function 1100 comprises a processor or processing unit 1102 that controls the operation of the function 1100. The NAF registration function 1100 also comprises a memory or memory unit 1104 that is connected to the processing unit 1102 and that contains instructions or computer code executable by the processing unit 1102 and other information or data required for the operation of the NAF registration function in accordance with the methods described herein. As shown, the NAF registration function includes a transceiver 1106 that may include a transmitter and a receiver configured to provide radio communications with at least one other device, such as a wireless terminal or user equipment device.

Figure 11:
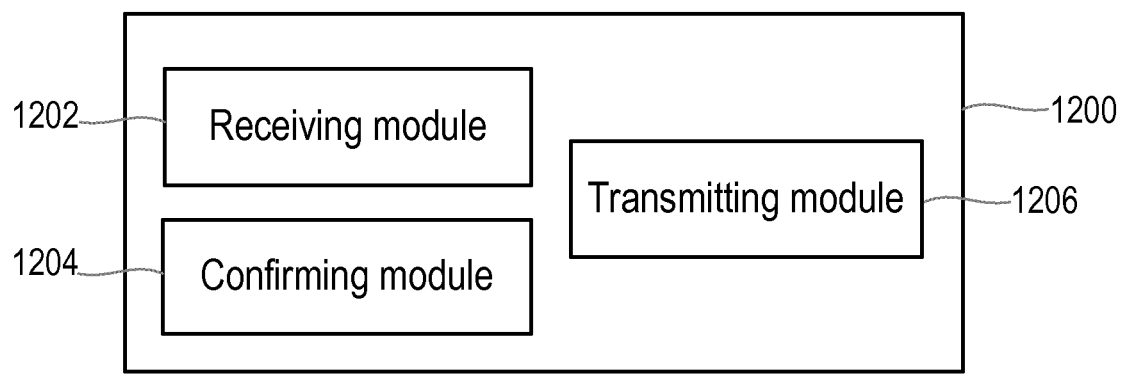
FIG. 11 illustrates a Network Application Function registration function in accordance with an aspect of the invention.

FIG. 11 illustrates functional units in embodiments of a Network Application Function, NAF, registration function which may execute any of the methods described herein, for example according to computer readable instructions received from a computer program. It will be understood that the modules illustrated in FIG. 12 may be software implemented functional units, realised in any appropriate combination of software modules, or may be hardware implemented functional units, realised in any appropriate combination of hardware units, or any combination thereof.

FIG. 11 illustrates a Network Application Function, NAF, registration function which may be implemented in any suitable node of a communications network. The NAF registration function 1200 comprises a receiving module 1202, for receiving from a device a request to register as a NAF; a confirming module 1204, for confirming that that the device is authorised to act as a NAF; and a transmitting module 1206, for transmitting NAF registration information to the device.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluoRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

Thus, these embodiments provide mutual authentication, verify the identity of the device registering as a NAF (based on the 3GPP subscription used by the device) and establish a shared secret between the device registering as a NAF and the BSF. The NAF registration function, which may be in the BSF or in a separate node such as an independent NAF, may allocate a FQDN for the newly registered NAF. The effect is that the SIM credentials in the device registering as a NAF provide the required authentication of the device, and the existing trust relationships confirm the authorization of that device to act as a NAF.

There are thus described methods for registering a device as a Network Application Function in the Generic Bootstrapping Architecture.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of registration of a device as a Network Application Function (NAF) in a Generic Bootstrapping Architecture (GBA), the method comprising:
    the device performing a GBA bootstrap operation with a Bootstrapping Server Function (BSF);
    after performing the GBA bootstrap operation with the BSF, the device sending to a NAF registration function a registration request to register the device as a NAF with the BSF;
    after sending the registration request to the NAF registration function, the device receiving a response to the registration request, wherein the response was transmitted by the NAF registration function and the response to the registration request comprises NAF registration information comprising a fully qualified domain name (FQDN) for identifying the device, wherein the FQDN was allocated to the device by the NAF registration function in response to receiving the registration request; and
    after receiving the NAF registration information from the NAF registration function, the device performing a NAF registration with the BSF, wherein
    the registration request comprises a suggested FQDN and the FQDN allocated to the device is the suggested FQDN.

2. The method of claim 1, further comprising, after receiving the NAF registration information from the NAF registration function:
    establishing a Transport Layer Security (TLS) connection with the BSF; and
    performing said NAF registration with the BSF using said TLS connection.

3. The method of claim 1, further comprising, after receiving the NAF registration information from the NAF registration function:
    obtaining a certificate from a certification authority; and
    performing said NAF registration with the BSF using said certificate.

4. The method of claim 3, wherein the certification authority is a GBA NAF.

5. The method of claim 1, wherein the NAF registration function is implemented in said BSF.

6. A computer program product comprising a non-transitory computer readable medium storing a computer program configured, when run on a computer, to carry out the method of claim 1.

7. A device, suitable for registration as a Network Application Function (NAF) in a Generic Bootstrapping Architecture (GBA), the device comprising a processor and a memory, the memory containing instructions executable by the processor, such that the device is operable to:
    perform a GBA bootstrap operation with a Bootstrapping Server Function (BSF);
    after performing the GBA bootstrap operation with the BSF, send to a NAF registration function a registration request to register the device as a NAF with the BSF;
    after sending the request to the NAF registration function, receive a response to the registration request, wherein the response was transmitted by the NAF registration function and the response to the registration request comprises NAF registration information comprising a fully qualified domain name (FQDN) for identifying the device, wherein the FQDN was allocated to the device by the NAF registration function in response to receiving the registration request; and
    after receiving the NAF registration information from the NAF registration function, perform a NAF registration with the BSF, wherein
    the registration request comprises a suggested FQDN and the FQDN allocated to the device is the suggested FQDN.

8. A method of operation of a Network Application Function (NAF) registration function, the method comprising:
    receiving from a device a registration request to register the device as a NAF with a Bootstrapping Server Function (BSF), wherein the device performed a Generic Bootstrapping Architecture (GBA) bootstrap operation with the BSF;
    after receiving the registration request from the device, confirming that the device is authorized to act as a NAF; and
    after confirming that the device is authorized to act as a NAF, allocating a fully qualified domain name (FQDN) for identifying the device and transmitting to the device a response to the registration request, the response to the registration request comprising NAF registration information comprising the allocated FQDN, wherein
    the registration request comprises a suggested FQDN and the FQDN allocated to the device is the suggested FQDN, and wherein the device performs a NAF registration with the BSF after receiving the NAF registration information.

9. The method of claim 8, wherein the NAF registration function is implemented in a Bootstrapping Server Function (BSF).

10. The method of claim 9, further comprising receiving the request to register as a NAF, during a Generic Bootstrapping Architecture (GBA) bootstrap operation with the device.

11. The method of claim 10, further comprising, after transmitting the NAF registration information to the device:
    establishing a Pre-Shared Key (PSK) Transport Layer Security (TLS) connection with the device, based on the security of the GBA bootstrapping; and
    performing NAF registration with the device using said PSK TLS connection.

12. The method of claim 9, further comprising, after transmitting the NAF registration information to the device:
    establishing a Transport Layer Security (TLS) connection with the device using a certificate obtained by the device from a certification authority; and
    performing NAF registration with the device using the certificate.

13. The method of claim 8, comprising confirming with a Home Subscriber Server of a mobile network core network that the device is authorised to act as a NAF.

14. The method of claim 13, comprising obtaining User Security Settings from the Home Subscriber Server, and confirming from the User Security Settings that the device is authorised to act as a NAF.

15. The method of claim 13, comprising obtaining information direct from the Home Subscriber Server, confirming whether the device is authorised to act as a NAF.

16. The method of claim 8, wherein allocating the FQDN for the device comprises one of: i) generating an FQDN for the device or approving a FQDN included in the registration request transmitted by the device.

17. The method of claim 16, wherein the FQDN has a predetermined expiry time.

18. A computer program product comprising a non-transitory computer readable medium storing a computer program configured, when run on a computer, to carry out the method of claim 8.

19. A Network Application Function (NAF) registration function comprising a processor and a memory, the memory containing instructions executable by the processor, such that the radio access network node is operable to:
   receive from a device a registration request to register the device as a NAF with a Bootstrapping Server Function (BSF), wherein the device performed a Generic Bootstrapping Architecture (GBA) bootstrap operation with the BSF;
   after receiving the registration request from the device, confirm that the device is authorized to act as a NAF; and
   after confirming that the device is authorized to act as a NAF, allocate a fully qualified domain name (FQDN) for identifying the device and transmit to the device a response to the registration request, the response to the registration request comprising NAF registration information comprising the selected FQDN, wherein
   the registration request comprises a suggested FQDN and the FQDN allocated to the device is the suggested FQDN, and wherein the device performs a NAF registration with the BSF after receiving the NAF registration information.

20. A method of registration of a device as a Network Application Function (NAF), the method comprising:
   the device sending to a network function a first request;
   after sending the first request to the network function, the device receiving a first response transmitted by the network function, wherein the first response comprises authentication information;
   after receiving the first response comprising the authentication information, the device sending to the network function a registration request to register the device as a NAF with a bootstrapping server function (BSF), the registration request comprising information generated by the device using the authentication information;
   after sending the registration request to the network function, the device receiving a response to the registration request, wherein the response to the registration request was transmitted by the network function and comprises a fully qualified domain name (FQDN) selected by the network function in response to receiving the registration request; and
   after receiving the response to the registration request, causing the BSF to mark the device as a registered NAF, wherein
   the step of causing the BSF to mark the device as a registered NAF comprises the device establishing a secure connection with BSF.

* * * * *